United States Patent
Riffe

(10) Patent No.: US 6,390,287 B2
(45) Date of Patent: *May 21, 2002

(54) SELF-ADJUSTING CARRYING IDLER ASSEMBLY

(75) Inventor: Shirley D. Riffe, Crab Orchard, WV (US)

(73) Assignee: The Robbins Company, Solon, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 09/329,812

(22) Filed: Jun. 10, 1999

(51) Int. Cl.⁷ .............................................. B65G 39/10
(52) U.S. Cl. .................... 198/830; 198/806; 198/810.03
(58) Field of Search ................................ 198/808, 830, 198/839, 806, 810.03

(56) References Cited

U.S. PATENT DOCUMENTS

| | | | | |
|---|---|---|---|---|
| 1,815,099 A | * | 7/1931 | Foote | 198/808 |
| 2,575,598 A | * | 11/1951 | Shank | 198/830 |
| 4,917,232 A | | 4/1990 | Densmore | |
| 5,341,920 A | | 8/1994 | Riffe | |
| 5,358,098 A | * | 10/1994 | Sundstrom et al. | 198/806 |

FOREIGN PATENT DOCUMENTS

| | | | | |
|---|---|---|---|---|
| DE | 971808 | * | 3/1959 | 198/808 |
| SE | 111443 | * | 8/1944 | 198/830 |
| SU | 609690 | * | 6/1978 | 198/808 |
| SU | 783148 | * | 11/1980 | 198/830 |
| SU | 797980 | * | 1/1981 | 198/839 |
| SU | 870285 | * | 10/1981 | 198/808 |
| SU | 1661097 | * | 7/1991 | 198/808 |

* cited by examiner

Primary Examiner—Thomas J. Brahan
(74) Attorney, Agent, or Firm—Pearne & Gordon LLP

(57) ABSTRACT

A conveyor belt idler support includes a fixed frame having support idlers for a return path of the belt. A movable frame is mounted on the fixed frame and is tiltable to support the carrying portion of the belt with a varying degree of tilt to allow the belt extend in a curved path around corners. The fixed frame has a projecting bracket carrying support rollers which extends into a hollow box portion at the center of the movable frame adjacent the middle to support most of the load on the movable frame. The movable frame has a center section and outwardly and upwardly sloping side sections each carrying idlers to define a trough for the belt. At one side, the movable frame carries a upwardly extending guide roller to limit lateral movement of the belt and allow the belt to apply a lateral force to the movable frame to tilt it about the support roller. At the other side is a fixed rigid link pivotally secured to both the support frame and the movable frame which is rotatable as the movable frame moves sideward to cause the frame to tilt in a controlled manner to achieve the desired tilt angle for the belt.

12 Claims, 4 Drawing Sheets

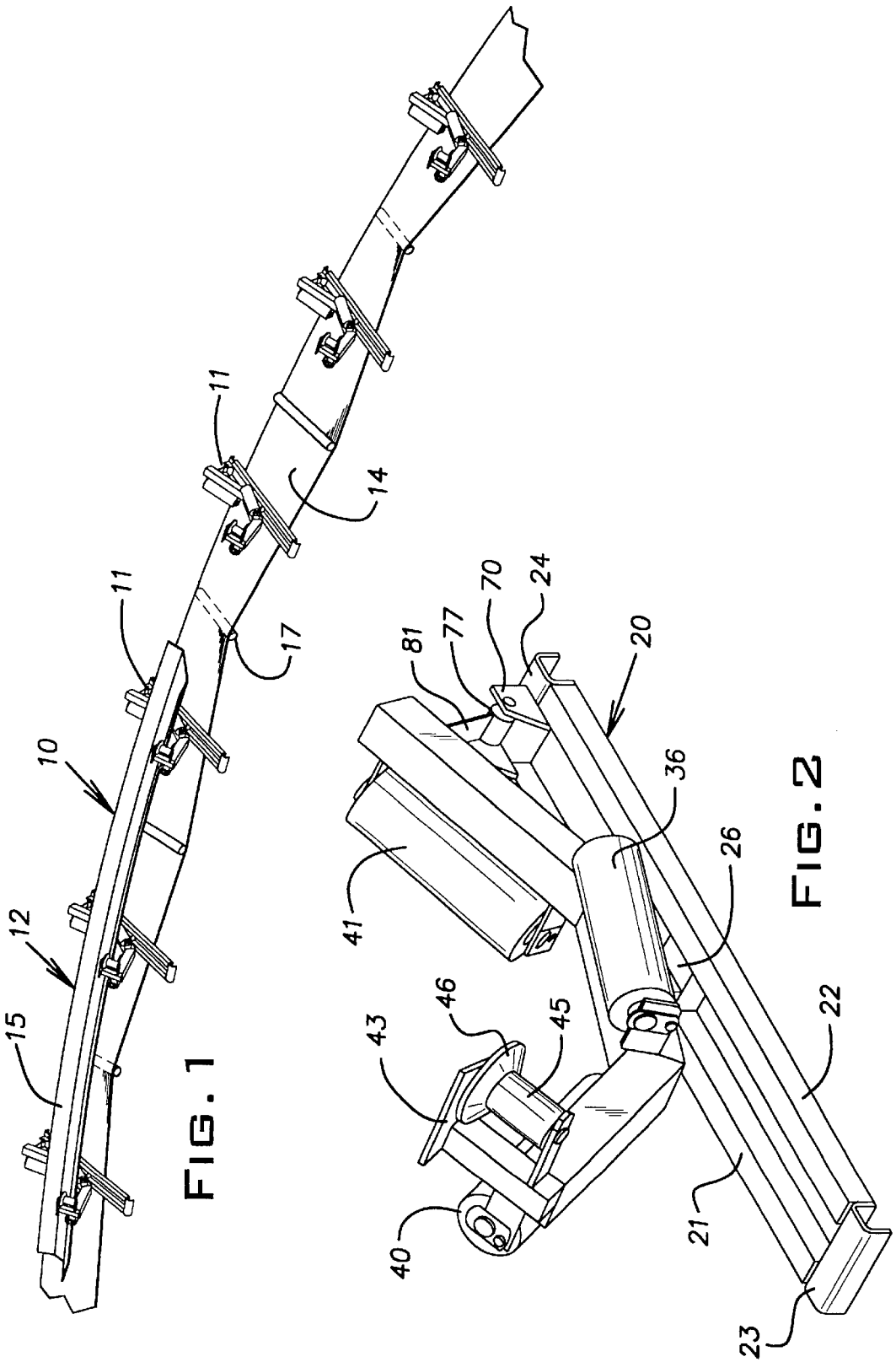

SELF-ADJUSTING CARRYING IDLER ASSEMBLY

BACKGROUND OF THE INVENTION

This invention relates generally to belt conveyor carrying idlers and more particularly to belt carrying or support idler units which are tiltable to permit the conveyor belt to move in a curved path.

Belt conveyors of the endless belt type have long been used to move a continuous stream of granular or particulate material, particularly where the feed rates are relatively constant so that the material will fill the belt at a relatively constant or uniform rate. In order to maintain material centered on the belt, the belts are generally formed to have a flat center section and upwardly sloping side sections and therefore the support idlers over which the belt rides and which are located at spaced intervals generally consist of three rollers in a conforming configuration. While the three idler rollers may be arranged with their axes in a plane, it has been found that better support can be obtained by having the center roller shifted laterally so that the rollers may be increased in length and provide better support.

When the conveyor extends in a straight line, the conveyor idler assemblies need not be concerned with lateral movement because the trough shaped center is automatically self centering when the belt is under tension as it is when transporting material. However, at times it is necessary to have the conveyor follow a curved path to change direction in a horizontal plane and when this occurs there is a differential tension in the belt between the inner and outer edges as a result of the curve. Thus if the conventional idler assembly were to be used on curves there would be a natural tendency of the belt to move up along the idler roller on the inside of the curve so that if the radius of curvature was other than very long with respect to the belt size, the belt would tend to run off the roller supports toward the inside of the curve. Thus it has been found necessary to provide some arrangement to provide a counteracting force on the belt to keep it centered on the rollers.

One approach to this has been to provide edge rollers such as those shown in U.S. Pat. No. 4,917,232 which engage the edges of the belt and retain it in position. However, such arrangements not only tend to produce excessive wear along the belt edges, but they are effective only when the radius of curvature is quite large so that the differential tension between the inside and outside edges of the belt is relatively small and the belt itself is relatively rigid to prevent any lateral buckling or folding as a result of the force on the belt from the edge rollers.

Another approach has been to tilt the belt by suspending the idler roller assembly from an upper pivot to allow the belt to swing back and forth under the load to provide a self-aligning support for the belt. This arrangement again only works in curves with a very large radius of curvature and requires a great deal of lateral space to allow movement of the suspended assembly for the necessary degree of tilt. Since such space is often not available, particularly in underground tunnels and other areas, it has been found desirable to have the belt tilt with a minimum of lateral movement. One such arrangement is disclosed in the present inventor's U.S. Pat. No. 5,341,920, granted Aug. 30, 1994. With this arrangement, the idler assembly consists of a fixed support frame having upwardly extending wheel or roller supports carrying wheels which engage tracks in the side of each of the sloping side channels of the movable support frame to support the movable frame on each side of the center line of the belt. At one side which is on the interior of the curve, is mounted a side roller to limit belt movement, and this side roller rotates about an axis perpendicular to the adjacent side member. When the assembly is mounted on a curved portion of the conveyor, the belt, because of the differential tension between the inside and outside produced by the curvature, tends to ride upward to engage the side roller and this force, together with the shifting weight of the load of material on the belt, causes the frame to tilt until the forces are in equilibrium. Because movement requires some pressure engagement between the belt edge and the side roller, the result has been a tendency of the belt to wear and even begin to delaminate along the edge under long continued usage.

SUMMARY OF THE INVENTION

The present invention provides a self-adjusting carrying idler assembly of improved and simplified construction which minimizes the forces required to tilt the assembly when the belt is on a curve and which minimizes edge wear and other stresses on the belt itself.

In the preferred embodiment of the present invention a generally horizontal fixed frame is provided which is supported at the ends and includes a pair of frame members spaced apart and providing a support plate between them which is positioned near the center line of the conveyor. This support plate provides an adjustable mounting for a wheel bracket which extends upward and carries a pair of spaced support rollers or wheels having an axis of rotation perpendicular to the frame and parallel to the center line of the belt. Also mounted on this support bracket is a horizontal roller having a substantially vertical axis of rotation which serves as a guide and takes any thrust along the axis the conveyor.

A movable or cradle frame of hollow box members is mounted above the fixed frame and consists of a center section and two side sections each extending upwardly at an angle to the center section and welded together as a unitary piece. The center section has a slot in the bottom wall through which the mounting bracket extends so that the support wheels and guide wheel engage the inside surfaces of the box to allow relatively close tolerances as well as protection from foreign matter such as the material being carried on the belt to prevent possible damage or excessive wear for the wheels. Each section of the movable frame has a pair of laterally extending brackets which provide support at each end for the carrying idlers. One idler is carried on one side of the center section and the other two on the opposite sides of the two side sections, and in accordance with usual practice make an angle of about 40° with the center section to define the shape of the trough of the upper or carrying portion of the belt. On the side section at the outer end of what is to be the inside of the curve is mounted a guide roller which is positioned to be engageable by the edge of the belt to provide the necessary force to tilt the assembly to the desired degree.

Since the movable frame is supported basically at only a single point, it is free to rock back and forth about that point, and to provide the necessary stabilization and angular positioning, a crank arm is connected between the outer edge of the support frame and the outer edge of the side section opposite the guide roller. This crank arm is of such a length that it would be close to vertical if the center section of the movable frame were exactly horizontal. However, since there is no need for the extra expense and complexity of a movable carrying idler arrangement when the belt is perfectly straight and horizontal, the support bracket carries an angle bracket which also serves as a flat stop plate and as a support for the guide roller. The stop plate is engageable by the upper wall of the box section of the center section when the unit is tilted about 5° so that the movable frame is never tilted at less than the 5° that would be the initial position at the entry or exit from a curve. On the other hand, the assembly can tilt up to a maximum of about 20° in a typical application since any higher tilt would risk the loss of some of the material being carried off the outside of the curve.

With the present arrangement the forces required to tilt the movable frame and which are produced by the contact between the belt edge and the side roller are minimized so that the pressure on the belt edge tending the damage the belt is greatly reduced.

Another feature is that the position of the support bracket is adjustable longitudinally along the fixed frame so that the pivot point moves with respect to the center of the belt. This, in turn, varies the force required to tilt the movable frame and compensate for changes in the radius of the curve of the belt.

Further features and advantages of the invention become apparent upon the more complete description in the following detailed description and the drawings.

BRIEF DESCRIPTION OF THE DRAWINGS

FIG. 1 is a fragmentary perspective view of a section of a conveyor showing a plurality of the carrying idler assemblies of the present invention and a portion of the belt passing through a curve;

FIG. 2 is a perspective view of a carrying idler assembly according to the preferred embodiment of the present invention without the conveyor belt;

DETAILED DESCRIPTION OF THE PREFERRED EMBODIMENT

Figure 3:
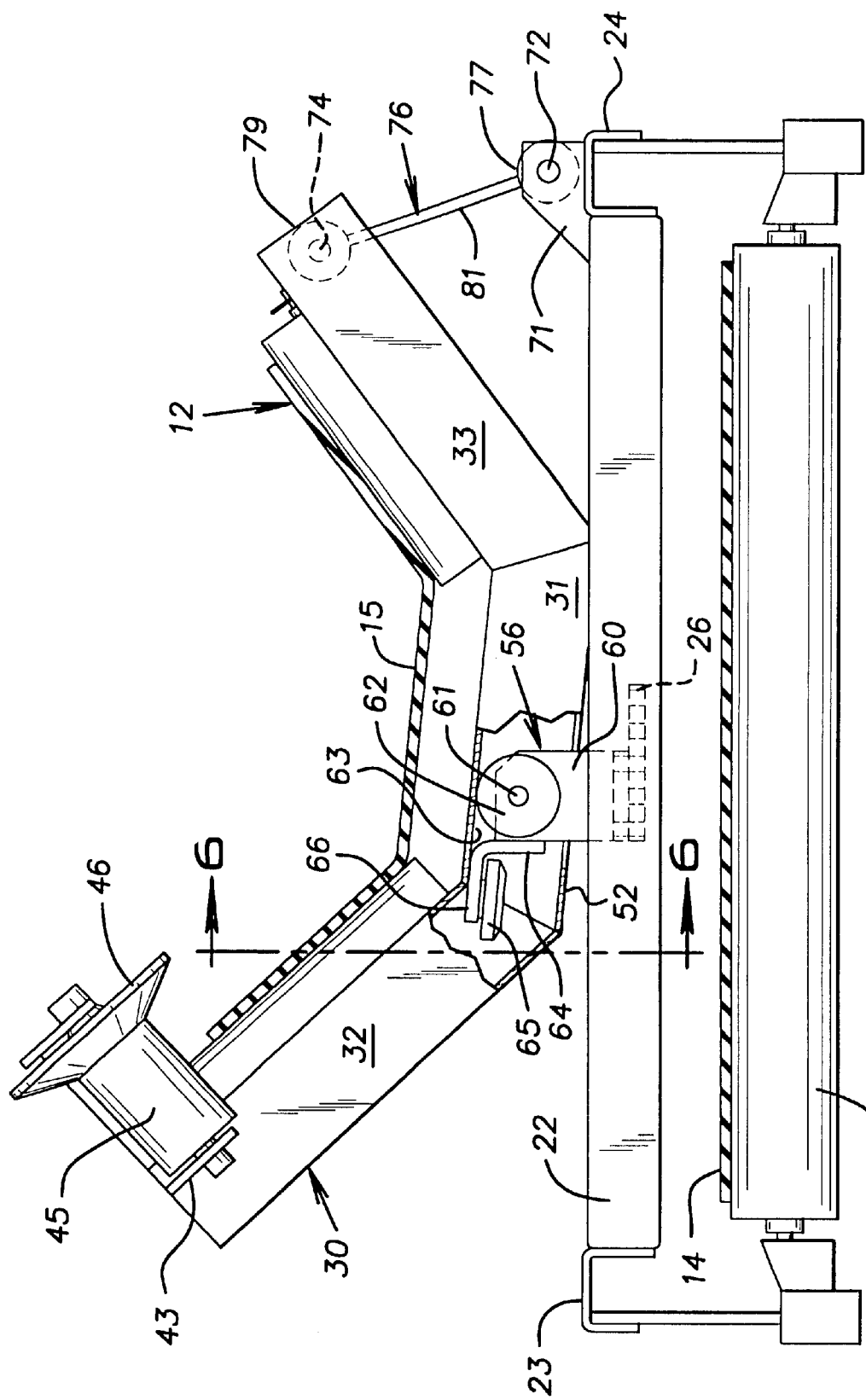
FIG. 3 is an elevational view with parts broken away of a complete carrying idler unit at minimum tilt and including the belt return support.

Referring now to the drawings in greater detail, FIG. 1 shows a fragmentary portion of a conveyor assembly 10 passing around a relatively long radius curve. As shown, there are a plurality of idler roll assembly units 11 mounted on a suitable surface such as a tunnel floor by a supporting framework which is not shown since it forms no part of the present invention. The spacing of the assemblies 11 depends upon the belt size and load of the belt 12. This belt has a carrying portion 15 on the upper surface supported directly on rollers of each assembly as described in greater detail hereinafter. The return portion 14 of the belt is supported in a flat configuration either on intermediately spaced return idlers 17 or such idlers may become the lower portion of each idler roll unit 11 as shown in FIG. 3.

Figure 5:
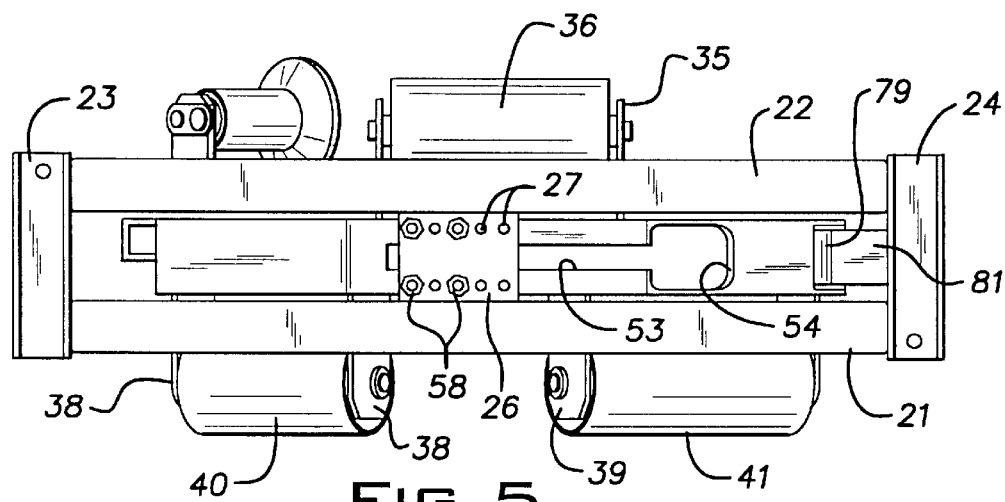
FIG. 5 is a bottom plan view of the assembly.
Figure 6:
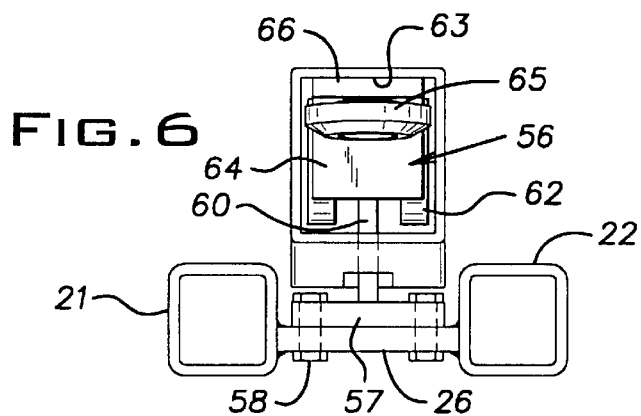
FIG. 6 is a cross-sectional view taken on line 6—6 of FIG. 3.

Each of the idler roll units comprises a fixed frame 20 having a pair of side members 21 and 22 spaced apart and parallel to each other and secured at each end to end members 23 and 24 to form a rigid unit. The side members 21 and 22 are preferably formed from square steel tubing while the end members each comprises an inverted channel designed to rest on top of other supporting structures. Adjacent the middle of the side members 21 and 22 there is mounted a flat support plate 26 welded to each of the side members not only to increase the rigidity of the fixed frame but to provide a roller support to carry most of the weight of the conveyor belt and its load. As shown in FIG. 5, the support plate 26 is preferably mounted slightly offset toward the end member 23 and is provided with a plurality of aligned holes 27 for adjustment purposes as explained hereinafter.

A movable or cradle frame 30 is mounted above the fixed frame 20 and includes a center section 31 and two side sections 32 and 33 which are welded together as a unit. Each of the sections 31, 32 and 33 is formed from identically box-shaped or square tubing and each of the side sections makes an angle of about 40° with the center section. On one side of center section 31 at opposite ends are mounted brackets 35 to support a center roller 36 by customary anti-friction bearings with the upper surface of the roller surface 36 projecting above the top surface of the center section 31. In like manner, pairs of brackets 38 and 39 on the opposite sides of side sections 32 and 33 support side rollers 40 and 41 by anti-friction bearings in the same manner as roller 36. By placing the center roller 36 and the side rollers 40 and 41 on opposite sides of the frame 30, a better support is provided for the belt and the vertical loading on the belt is distributed more evenly to minimize any lateral or twisting forces on the movable cradle 30. As shown in FIG. 3, the belt 12 is formed so that it lies across and conforms to the three rollers 36, 40 and 41 to provide a trough for carrying the material while preventing it from falling laterally off the belt even as the belt goes through a radius curve. Since most of the weight of the material lies on the belt center section and is supported by the center roller 36, this weight tends to be balanced by the lesser amount of material supported by the side rollers 40 and 41, and combined with the forces from the movement of the belt over the rollers, the cradle frame is supported with a minimum of force acting on it in the direction of the axis of the belt.

To constrain movement of the belt when it goes around a curve as well as to provide the force to tilt the cradle frame, a bracket 43 is mounted at the outer end of the side section 32 on the opposite side of the roller 40 and extends upward perpendicular to the top surface of the side section. Bracket 43 carries an edge roller 45 having a limiting flange 46 on the upper side to prevent the belt from moving entirely off the roller and when the belt tends to move sideways around a curve the belt moves up the side roller 40 until the edge engages the edge roller 45 which causes the cradle frame to tilt as described in greater detail hereinafter.

Both support and lateral guidance of the cradle frame 30 is provided by a roller assembly mounted on the support plate 26. As best shown in FIG. 5, the bottom wall 51 of center section 31 is provided with an elongated slot 53 which terminates at the one end in an enlarged opening 54 formed in the bottom wall 52 of side section 32. A mounting bracket 56 has a base 57 which rests on support plate 26 and is secured thereto by bolts 58 extending through bolt holes 27. Since there are plurality of sets of holes 27, it will be noted that bracket 56 can be mounted at several different longitudinal locations along the fixed frame 20 to change the location of the pivot support of cradle frame 30. Thus, FIGS. 3, 4 and 5 show one end position and FIG. 7 shows the bracket 56 at the other end position.

The mounting bracket 56 includes a standard 60 extending upward from the base 57 in passing through the slot 53 into the interior of the center section 31. The slot 53 thus serves to allow the center section and the entire cradle frame to move back and forth with respect to the mounting bracket 56 and the enlarged opening 54 provides clearance for insertion of the rest of the roller assembly carried by bracket 56 into the center section 31. Standard 60 at its upper end carries a stub axle 61 having a horizontal axis and journalling a pair of support rollers 62 which bear against the top wall 63 of center section 31. This arrangement allows the cradle frame to not only rock about the axis of stub axle 61 but also slide longitudinally with respect to fixed frame 20 and perpendicularly to the axis of the belt. Standard 60 also carries an angle bracket 64 supporting a guide roller 65 for rotation about a nearly vertical axis to engage the side walls of the center section 31 and prevent lateral movement thereof. The angle bracket 64 has an upper side 66 which extends at a slight angle of approximately 5° to the horizontal as defined by the fixed frame 20 and when the cradle is in the lower most or most nearly horizontal position, the top wall 63 will make abutting contact with the upper side 66 and thereby limit motion of the cradle frame 30 toward the horizontal position.

To control the position and motion of the movable frame 30, additional support and guidance is provided by a rigid link or crank arm arrangement on the side opposite the edge roller 45. On the top of end member 24 of fixed frame 20 there is mounted a bracket 70 having a pair of upstanding ears 71 which support a cross pin 72. Likewise, a second cross pin 74 is mounted between the side walls of the outer end of side section 33 parallel to crank pin 72. A crank arm 76 having a center section 81 extending between ends 77 and 79 guides and anchors the movable frame. Since the crank arm end 77 and 79 are mounted on anti-friction bearings on cross pin 72 and 74 the entire arrangement of cradle 30 has a minimum of friction allowing it to move between the positions shown in FIGS. 3 and FIG. 4.

Figure 4:
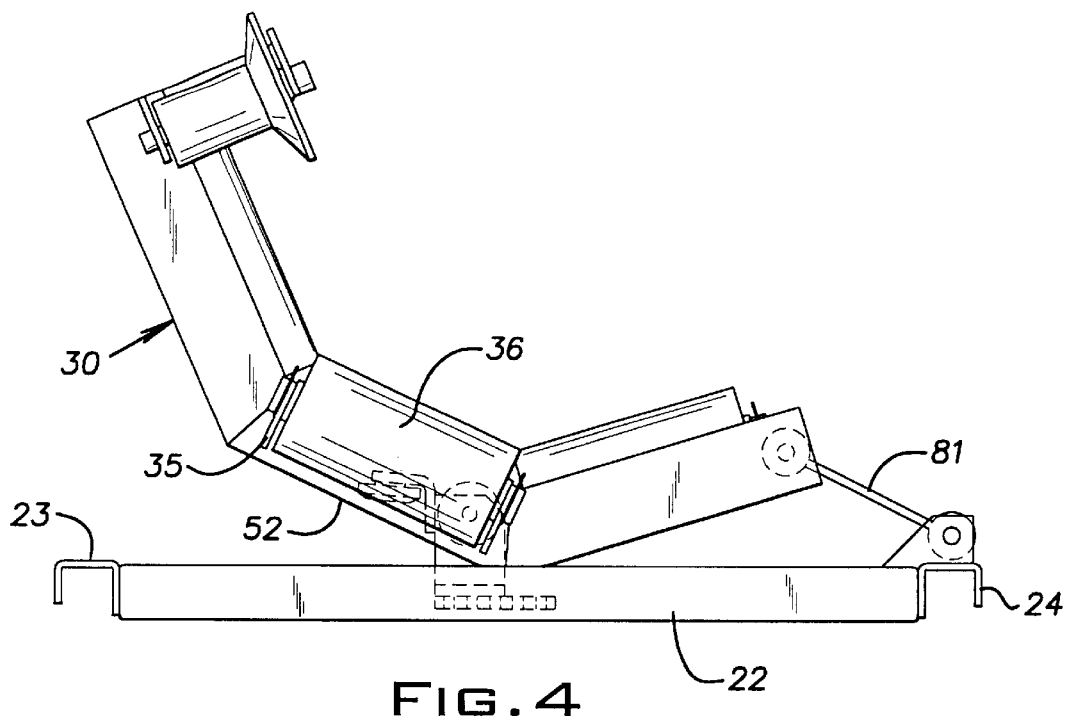
FIG. 4 is a side elevational view of the unit shown in FIG. 3 but at maximum tilt.
Figure 7:
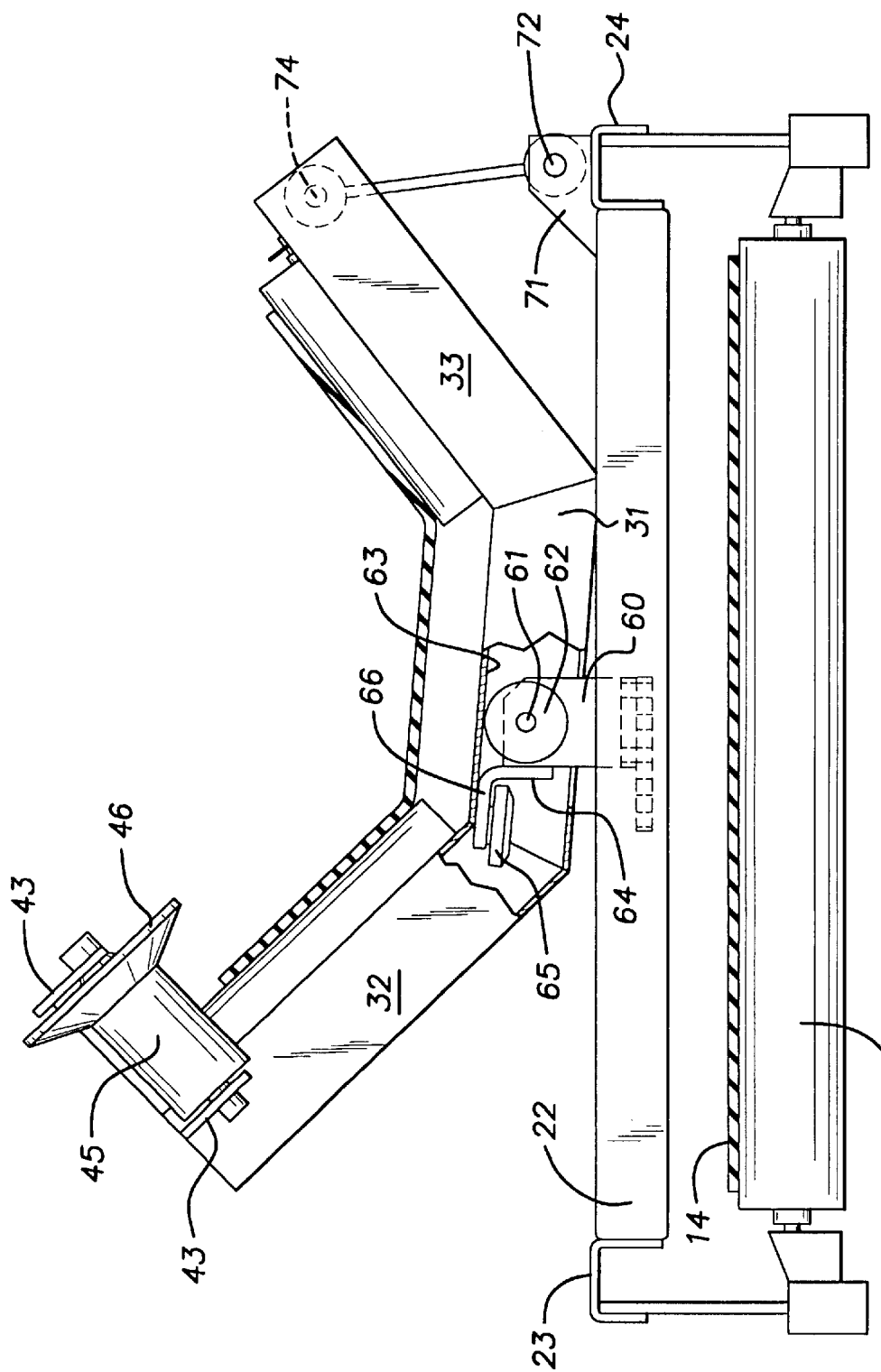
FIG. 7 is an elevational view similar to FIG. 3 but with the mounting bracket shifted to the right hand position.

The operation of the assembly is best seen from FIGS. 3, 4 and 7. Turning to FIG. 3, assuming that the load is evenly distributed on the belt, it will have an effective downward weight force in the middle of center section 31. Since this weight tends to act, as shown in FIG. 3, to the right of the support rollers 62 there is little tendency for the assembly to tilt. On the other hand, if the belt is extending around a curve, as shown in FIG. 1, the belt will in effect tend to tilt outward and since the effect of the tension forces on the belt tends to move the belt toward the inside of the curve, the edge of the belt will ride up until it contacts the edge roller 45 and the resulting force applied to the cradle will tend to tilt the assembly from the bottom position shown in FIG. 3 toward the extreme tilt position shown in FIG. 4. As the frame tilts, it moves toward the left as shown in FIG. 3 and rolls upward on the support rollers 62 tending to move the center of gravity toward the left and as a result, this force also tends to increase the tilt. On the other hand, the crank arm 76 changes its angularity as it moves from a near vertical position toward the horizontal so that it provides a greater restraining force to limit the tilt, so that depending upon the load on the belt and the radius of curvature the forces will come into balance and the movable frame on a curve will generally assume a position intermediate the extremes shown in FIGS. 3 and 4.

The balance of forces can be changed by movement of the mounting bracket 56 to different positions along the support plate 26. In FIGS. 2–6 the mounting bracket 56 has been shown as positioned in the left hand set of holes as shown in FIG. 5. If the bracket were repositioned by bolting it in the right hand position the result would be the arrangement shown in FIG. 7. As can be seen, the angular position of the movable frame 30 remains at 50 as determined by the contact between the upper wall of center section 31 and the angle bracket 64 but the center of the belt is now closer to the center of the support roller 62 and the crank arm 76 is now closer to a vertical position. In this position, the force required to tilt the movable frame around the curve is decreased and under the same radius of curvature and belt load the tilt will assume a higher angle and this tends to minimize the contact between the belt edge and the edge roller 45 and minimizes wear on the belt edge as a result of this contact. With the adjustablilty for the forces provided by different belt loading and different radius of curvature for the belt, the adjustment can be made by moving the position of the bracket 56 so that the assembly can operate with a minimum edge load of the belt against the edge roller 45 to produce a balanced tilt angle for the cradle with a minimum of edge force on the belt to minimize belt wear at this point.

This arrangement permits rocking of the cradle in only one direction since the edge roller 45 must always be on the inside of the curve. However, if a curve in the opposite direction is desired, it is only necessary to mount the entire assembly with a fixed frame rotated 180° to again place the edge roller on the inside of the curve. Because of the balance of forces resulting from the center roller being on the opposite side from the two side rollers and the fact that a normal belt loading the center roller takes a vertical load equal to the sum of the loads on both side rollers it is not significant whether the center is in the leading or lagging position with regard to the direction of belt movement. By mounting the support rollers and the rest of the mechanism carried by bracket 56 within the hollow box section of the center section 31, this arrangement is generally shielded from any dirt or other material such as spills of material from the belt, which could interfere with proper lubrication and operation of the unit.

While the preferred embodiment of the invention has been shown and described in detail, it is recognized that various modifications and rearrangements may be resorted to without departing from the scope of the invention as defined in the claims.

What is claimed is:

1. A conveyor belt idler support apparatus for allowing a conveyor belt to follow a curved path, comprising: a conveyor belt, a base support frame extending transversely to said path, a movable frame above said base support frame and having a center section and left and right side sections extending outwardly and upwardly from said center section, said sections being rigid with respect to one another, each of said sections mounting an idler roller to support said belt, a track, a support roller engaging said track one of said track or roller being on said base support frame and the other of said track or roller being on said movable frame, said roller and track mounting said center section for lateral linear movement and pivotal movement on said support frame, any roller being arranged to support the movable frame for pivotal movement having a common single axis, and a link pivotally secured to said base frame and to one of said side sections and arranged in such a manner to cause lateral movement of said movable frame with respect to said base support frame to rotate said movable frame about said support roller and tilt said movable frame with respect to said base support frame.

2. A conveyor belt idler support apparatus as set forth in claim 1, including an edge roller on the other of said side sections engageable by said belt to create a force tending to move said movable frame away from said link.

3. A conveyor belt idler support apparatus as set forth in claim 1, wherein said track is on said center section and said support roller is carried on said support frame.

4. A conveyor belt idler support apparatus as set forth in claim 3, wherein said center section is a box member having top and bottom walls, said bottom wall having a slot, said support roller is mounted on a bracket extending through said slot and said support roller bears against said top wall.

5. A conveyor belt idler support apparatus as set forth in claim 4 wherein said bracket is adjustably mounted on said support frame at different distances from said link.

6. A conveyor belt idler support apparatus as set forth in claim 4, wherein said box member has side walls and a roller is mounted on said support bracket, said roller being engageable by said side walls to limit lateral movement of said movable frame.

7. A conveyor belt idler support apparatus as set forth in claim 6 wherein said mounting bracket has a stop member engageable by said movable frame to limit movement toward a horizontal position.

8. A conveyor belt idler support apparatus for allowing a conveyor belt to follow a curved path, comprising: a conveyor belt, a base support frame extending transversely to said path, a rigid movable frame above said base support frame and carrying idler rollers to support said belt, a support roller and a track for supporting said movable frame for lateral linear and pivotal movement on said support frame, any roller being arranged to support the movable frame for pivotal movement having a common single axis, and a link pivotally secured to said base frame and to said movable frame and arranged in such a manner to cause lateral movement of said movable frame with respect to said base support frame to rotate said movable frame about said support roller to thereby tilt said idler rollers.

9. A conveyor belt idler support apparatus as set forth in claim 8 including a stop means to limit rotation of said movable frame toward the horizontal position.

10. A conveyor belt idler support apparatus for allowing a conveyor belt to follow a curved path, comprising: a conveyor belt, a base support frame extending transversely to said path, a rigid movable frame above said base support frame and carrying idler rollers to support said belt, said movable frame having a box shape with opposed generally vertical side walls and top and bottom walls, said bottom wall defining a slot, a mounting bracket secured to said base support frame adjacent the middle thereof, said bracket extending through said slot, at least one support roller journalled on said bracket and engaging the bottom of said top wall to support said movable frame for lateral linear and pivotal movement on said support frame, any roller being arranged to support the movable frame for pivotal movement having a common single axis, and a rigid link pivotally secured to said base frame and to said movable frame and arranged in such a manner to cause lateral movement of said movable frame on said roller with respect to said base support frame to rotate said movable frame about said support roller.

11. A conveyor belt idler support apparatus as set forth in claim 10 including a guide roller journalled on said bracket engaging said side walls to limit movement of said movable frame in the direction of said conveyor belt.

12. A conveyor belt idler support apparatus as set forth in claim 10 including a stop surface on said bracket engageable by said top wall to limit movement of said movable frame toward a horizontal position.

* * * * *

UNITED STATES PATENT AND TRADEMARK OFFICE
CERTIFICATE OF CORRECTION

PATENT NO. : 6,390,287 B2
DATED : May 21, 2002
INVENTOR(S) : Riffe

It is certified that error appears in the above-identified patent and that said Letters Patent is hereby corrected as shown below:

Column 5,
Line 36, please delete "FIGS." and insert therefor -- FIG --.

Column 6,
Line 2, please delete "50" and insert therefor -- 5° --.

Signed and Sealed this

Eighth Day of October, 2002

*Attest:*

*Attesting Officer*

JAMES E. ROGAN
*Director of the United States Patent and Trademark Office*